(12) United States Patent
Hamlin

(10) Patent No.: US 6,444,782 B1
(45) Date of Patent: Sep. 3, 2002

(54) PROCESS FOR MAKING PRE-GELS FOR A CROSS-LINKED BRANCHED POLYESTER

(75) Inventor: Michael D. Hamlin, Brockport, NY (US)

(73) Assignee: Eastman Chemical Company, Kingsport, TN (US)

(*) Notice: Subject to any disclaimer, the term of this patent is extended or adjusted under 35 U.S.C. 154(b) by 0 days.

(21) Appl. No.: 09/563,536

(22) Filed: Apr. 26, 2000

Related U.S. Application Data

(60) Provisional application No. 60/131,100, filed on Apr. 26, 1999, and provisional application No. 60/132,095, filed on Apr. 30, 1999.

(51) Int. Cl.$^7$ ............................................... C08G 63/66
(52) U.S. Cl. .................... 528/300; 528/272; 528/295.5; 528/302; 528/306; 528/307; 528/308; 528/308.6; 528/501; 528/503
(58) Field of Search .................... 528/272, 295.5, 528/300, 302, 306, 307, 308, 308.6, 501, 503

(56) References Cited

U.S. PATENT DOCUMENTS

| 3,522,214 A | 7/1970 | Crawford et al. |
| 3,535,280 A | 10/1970 | Schnell et al. |

(List continued on next page.)

FOREIGN PATENT DOCUMENTS

| DE | 22 32 877 | 5/1972 |
| DE | 259198 | 3/1988 |
| GB | 1121936 A | 5/1966 |
| JP | 9-124783 | 10/1995 |
| SU | 1269825 | 11/1986 |
| WO | WO 98/17123 | 4/1998 |
| WO | WO 98/17124 | 4/1998 |

OTHER PUBLICATIONS

Biehler, et al. "Small Laboratory Centrifugal Molecular Still," Analytical Chem., vol. 21(5):638–640 (1949).

(List continued on next page.)

Primary Examiner—Samuel A. Acquah
(74) Attorney, Agent, or Firm—Bernard J. Graves, Jr., Esq.; Michael Blake

(57) ABSTRACT

The invention relates to a process for making a high molecular weight pre-gel for a cross-linked branched polyester comprising:
  a) reacting polyester precursor repeat units via condensation polymerization in a continuous or semi-continuous, or batch reactor stage to form a low molecular weight pre-gel; and
  b) further reacting the low molecular weight pre-gel via condensation polymerization in a continuous thin-film reactive vacuum processing stage to form a high molecular weight pre-gel.

32 Claims, 11 Drawing Sheets

U.S. PATENT DOCUMENTS

| | | | |
|---|---|---|---|
| 3,695,327 | A | 10/1972 | Widmer |
| 4,096,122 | A | 6/1978 | Schade et al. |
| 4,237,261 | A | 12/1980 | Kawamura et al. |
| 4,319,017 | A | 3/1982 | Kosanovich et al. |
| 4,415,721 | A | 11/1983 | Kosanovich et al. |
| 4,465,819 | A | 8/1984 | Kosanovich et al. |
| 4,474,938 | A | 10/1984 | Richardson |
| 4,490,519 | A | 12/1984 | Kosanovich et al. |
| 4,540,771 | A | 9/1985 | Ambrose et al. |
| 5,217,642 | A | 6/1993 | Kud et al. |
| 5,302,255 | A | 4/1994 | Dorai et al. |
| 5,508,394 | A | 4/1996 | Kappes et al. |
| 5,616,681 | A | 4/1997 | Itoh et al. |
| 5,677,415 | A | 10/1997 | Bhatia |
| 5,714,553 | A | 2/1998 | Kim et al. |
| 5,856,423 | A | 1/1999 | Bhatia |
| 5,945,460 | A | 8/1999 | Ekart et al. |
| 5,980,797 | A | 11/1999 | Shelby et al. |
| 6,013,287 | A | 1/2000 | Bunczek et al. |
| 6,017,566 | A | 1/2000 | Bunczek et al. |

OTHER PUBLICATIONS

Kumar, et al. "Solution of Final Stages of Polyethylene Terephthalate Reactors Using Orthogonal Collocation Technique," *Polymer Eng. & Science*, vol. 24(3):194–204 (1984).

Apicella et al., "Kinetic and Catalytic Aspects of the Formation of Poly(ethylene terephthalate) (PET) Investigated with Model Molecules," *J. Applied Polymer Science*, 69:2423–2433 (1998).

Kienle et al., "The Polyhydric Alcohol–Polybasic Acid Reaction. VI. The Glyceryl Adipate and Glyceryl Sebacate Polyesters," *J. Am. Chem. Soc.*, 63:481–484 (1941).

Kiyotsukuri et al., "Network Polyester Films from Glycerol and Dicarboxylic Acids," *Polymer International*, 33:1–8 (1994).

Nagata, "Synthesis, Characterization, and Enzymatic Degradation of Novel Regular Network Aliphatic Polyesters Based on Pentaerythritol," *Macromolecules*, 30:6525–6530 (1997).

Copy of U.S. application Ser. No. 09/559,718.

1 = Approximate conversion of feed material (pre-gel) used in example 1.
2 = Plot of conversion as a function of reaction extent for cross-linked polymer comprised of adipic acid and glycerin.
3 = Calculated gel point of adipic acid/glycerin polymer.
4 = Plot of conversion as a function of reaction extent for linear polymer comprised of propylene glycol and adipic acid

Derivative of Polydispersity as a Function of Reaction Extent

1 = Derivative of Polydispersity (PDI) index as a function of reaction extent.
2 = Calculated gel point of crosslinked polymer of adipic acid/glycerin.

PROCESS FOR MAKING PRE-GELS FOR A CROSS-LINKED BRANCHED POLYESTER

This application claims the benefit of U.S. Provisional Application Serial No. 60/131,100, filed Apr. 26, 1999, and U.S. Provisional Application Serial No. 60/132,095, filed Apr. 30, 1999, and both provisional applications are herein incorporated by this reference in their entireties.

FIELD OF THE INVENTION

The invention relates to a process for crosslinked branched polyesters, and their use as a chewing gum base and in non-food applications.

BACKGROUND OF THE INVENTION

Aromatic polyesters such as poly (ethylene terephthalate) (PET), which are high melting and which have a high degree of cystallinity, are widely used in various molding and extrusion applications. Such applications include films, sheeting, bottles, containers and the like. Aliphatic polyesters generally have low melting points and are therefore much less useful in typical industrial applications. However, it was recently reported that certain aliphatic polyesters based on monomers approved for food applications are useful as a chewing gum base. It would therefore be beneficial to provide for improved polyesters for chewing gum bases and for non-food applications and improved methods of making such material.

The preparation of polyesters is described in a recent book by George Odian, *Principles of polymerization*, $2^{nd}$ edition, pages 102–105 (1981), John Wiley & Sons, NY. Branched or crosslinked polymers can be prepared by using at least some monomers having a functionality of at least three. An apparatus for making such branched polymers is shown on page 132 of this same reference.

WO 98/17123 and WO 98/17124 patents to Wm. Wrigley Jr. Company describe a gum base including at least one aliphatic polyester that is produced from glycerol, propylene glycol or 1,3-butylene glycol and an aliphatic acid containing 4 to 12 carbon atoms.

The reactive extrusion process is a time-dependent process in which the condensation reaction conversion and viscosity are coupled. Due to the coupled nature of the system, the reactive extrusion process is less stable in short-barrel processors with an L/D less than 10, such as units manufactured by Readco Products of York, Pensylvania. Extruders with L/D greater than 25, such as Werner & Pfleiderer 30 mm unit with L/D=40, provide a more stable operation, but are not cost effective as the Readco continuous processors. The throughput achieved in the reactive extrusion is roughly 10 lb/hr in a 2" Readco processor when a feed of roughly 0.70 conversion (absolute viscosity of 5 poise) to a gel greater than 0.77 conversion (absolute viscosity greater than 70,000 poise). However, this much conversion is not practical in a single extruder with L/D less than 25 due to process instability. One of the major drawbacks with the reactive extrusion process is that water removal is limited by mass transfer. Variability in the effectiveness of water removal in the extruder is believed to be a contributing factor to the inherent instability of the extrusion process in equipment with L/D<40 since the hold-up and residence time are directly related to viscosity and viscosity to the extent of reaction.

Other existing process technology to produce polyester resins by condensation polumerization typically utilizes vacuum process and/or inert gas stripping to facilitate the removal of water produced by polymerization. In particular, U.S. Pat. No. 5,714,553 to Kim, et al discloses a process performed in a continuously stirred tank reactor ("CSTR").

U.S. Pat. No. 3,535,280 to Court, et al., teaches condensation polymerization of thermoplastics, including polycarbonates, in a wiped, thin film reactor.

A wiped, thin-film apparatus described in U.S. Pat. No. 3,695,327 to Widmer is designed specifically for vacuum processing materials of high viscosity. An aspect of that invention relates primarily to the blade and wiper designs used for transport of viscous materials as a thin film.

In U.S. Pat. No. 3,522,214 to Crawford et al. discloses a condensation reaction of viscous linear pre-polymers, including polyethylene terephthalate, using an extruder or other processor configured with screw flights and designed for high hold up, thin-film processing under vacuum U.S. Pat. No. 4,237,261 to Kawamura et al. teaches that viscosity or conversion is controlled by adjusting the vacuum level in various stirred reactors, when the mixing power is used as a process indication of viscosity.

U.S. Pat. Nos. 4,319,017, 4,415,721, 4,465,819 and 4,465,819 to Kosanovich et al. disclose processes to produce thermotropic linear polyesters of aromatic dicarboxylic acids and diphenols. A two-step process is presented wherein a pre-polymer is prepared in the first step and subsequently reacted in a wiped-film reactor capable of high shear stress.

U.S. Pat. No. 5,302,255 to Dorai, et al. teaches that molecular weight distribution (polydispersity) of polyether glycols may be affected by short-path distillation. The use of two or more short-path stills in series is presented as a preferred process.

U.S. Pat. No. 4,474,938 to Richardson teaches a process for the polymerization of thermotropic linear aromatic polyester utilizing a wiped film reactor. The process in this patent is a two step process where a pre-polymer is prepared and then reacted using a single pass through the thin-film reactor.

U.S. Pat. No. 5,616,681 to Itoh et al. discloses a process for producing a linear biodegradable, aliphatic polyester at pressures between 0.3 and 3.0 Torr having high molecular weight.

DD 259,198 to Funk, et. al. teaches the polycondensation of polyethylene terephthalates. A novel reactor design is presented wherein a cylindrical, jacketed vessel with spray nozzles and baffles (fins) are provided to reduce entrainment.

None of the references disclose a process for making a crosslinked branched polyester pre-gel or gel that may be aliphatic and biodegradable for food applications, or aromatic or non-biodegradable for non-food applications. The disadvantages of the prior art are that the reactive extrusion process is relatively unstable due to the L/D limitations when more than 5% conversion is required in the extruder. Furthermore, the presence of unreacted adipic and palmitic acids, as well as the presence of low molecular weight oligomers affects the solubility of the final product in water. The processes of the prior art for crosslinked polyesters do not provide means for removal of substantially all of the unreacted acids and the low molecular weight oligomers as addressed by an embodiment of the present process of the invention. An additional drawback of the prior art reactive extrusion process is that it is both inefficient and costly to perform. Thus, there is a need to develop a stable commercially viable process for converting a pre-gel feed material to a crosslinked branched polyester gel in a controlled manner.

The present invention addresses the prior art problems by providing a low molecular weight pre-gel feed material to a continuous thin film reactive vacuum processing stage to obtain a high molecular weight pre-gel that is subsequently converted into a crosslinked gel by curing or by reactive extrusion.

Some advantages of the present process include:

(1) Branched cross-linked polyester gel polymers are produced from pre-gel using a stable process employing a batch reactor stage and a thin film reactive vacuum processing stage.

(2) The conversion of the low molecular weight pre-gel to a high molecular weight pre-gel can be controlled to within 1% of the gel point.

(3) Substantial removal of all unreacted aliphatic or aromatic polyfunctional acid or ester thereof and/or long chain aliphatic carboxylic acid or ester thereof or aromatic monocarboxylic acid or ester thereof and low molecular weight oligomers.

(4) The wiped film appratuses used are readily available, cost effective and provide a process that operates at throughputs typical of short-path distillation processes.

(5) Reduced product degradation due to lower temperatures and shorter residence times during the process compared to process that utilizes reactive extrusion alone.

(6) An optional reactive extrusion step can be incorporated or the pre-gel can be cured (crosslinked) until gel formation. However the use of the reactive wiped film vacuum processing step of the invention increases subsequent reactive extrusion throughput significantly since less conversion and little or no venting of water vapor is required in the extruder.

The present invention provides a process to produce a highly converted pre-gel, using a reactor stage to produce a low molecular weight pre-gel, and a thin film reactive vacuum processing stage to control the rate of conversion and extent of conversion of the pre-gel to create a high molecular weight pre-gel that is surprisingly close to the gel point and subsequently converting the high molecular weight pre-gel to a branched crosslinked polyester gel.

SUMMARY OF THE INVENTION

The present invention provides a process for making high molecular weight pre-gels for a crosslinked branched polyester. More specifically, the process can be used to prepare crosslinked branched aliphatic biodegradable polyesters which are particularly useful in food applications such as chewing gum bases, or the process can be used to prepare aromatic or non-biodegradable polyesters, which are useful for non-food applications including cosmetics, baking agents, customized emulsions, inks, pigment and the like.

In an embodiment, the invention provides a process for making a high molecular weight pre-gel for a cross-linked branched polyester comprising:

a) reacting polyester precursor units via condensation in a continuous or semi-continuous, or batch reactor stage to form a low molecular pre-gel; and b) further reacting the low molecular weight pre-gel via condensation polymerization in a continuous thin-film reactive vacuum processing stage to form a high molecular weight pre-gel.

In another embodiment, the invention provides a crosslinked branched aliphatic biodegradable gum base and chewing gum composition made by process of the present invention.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION OF THE INVENTION

The present invention may be understood more readily by reference to the following detailed description of preferred embodiments of the invention and the Examples included therein.

It must be noted that, as used in the specification and the appended claims, the singularly forms "a" "an" and "the" include the plural referents unless the context clearly dictates otherwise.

It must be noted that, as used herein as from "about" one particular value and/or to "about" another particular value. When such a range is expressed, another embodiment includes from the one particular value and/or to the other particular value. Similarly, when values are expressed as approximations, by use of the antecedent "about," it will be understood that the particular value forms another embodiment.

Ranges may be expressed herein as from "about" one particular value and/or to "about" another particular value.

When such a arrange is expressed, another embodiment includes from the one particular value and/or to the other particular value. Similarly, when the values are expressed as approximations, by use of the antecedent "about," it will be understood that the endpoints of each of the ranges are significant both in relation to the other endpoint, and independently of the other endpoint.

A weight percent of a component, unless specifically stated to the contrary, is based on the total weight of the formulation or composition in which the component is included.

The molecular weight ranges herein refer to the weight-average molecular weight.

"Optional" or "optionally" means that the subsequently described event or circumstance may or may not occur, and that the description includes instances where said event or circumstance occurs and instances where it does not. For example, the phrase "optionally substituted lower alkyl" means that the lower alkyl group may or may not be substituted and that the description includes both unsubstituted lower alkyl and lower alkyl where there is substitution.

The term "L/D" or "L:D" is meant to define the barrel length to diameter ratio.

A "Torr" is equivalent to 1 mm Hg absolute, which is equivalent to 1,000 $\mu$Hg absolute.

In one embodiment, the invention provides a process for making a high molecular weight pre-gel for a cross-linked branched polyester comprising:

a) reacting polyester precursor repeat units via condensation in a continuous or semi-continuous, or batch reactor stage to form a low molecular pre-gel; and b) further reacting the low molecular weight pre-gel via condensation polymerization in a continuous thin-film reactive vacuum processing stage to form a high molecular weight pre-gel.

Figure 2:
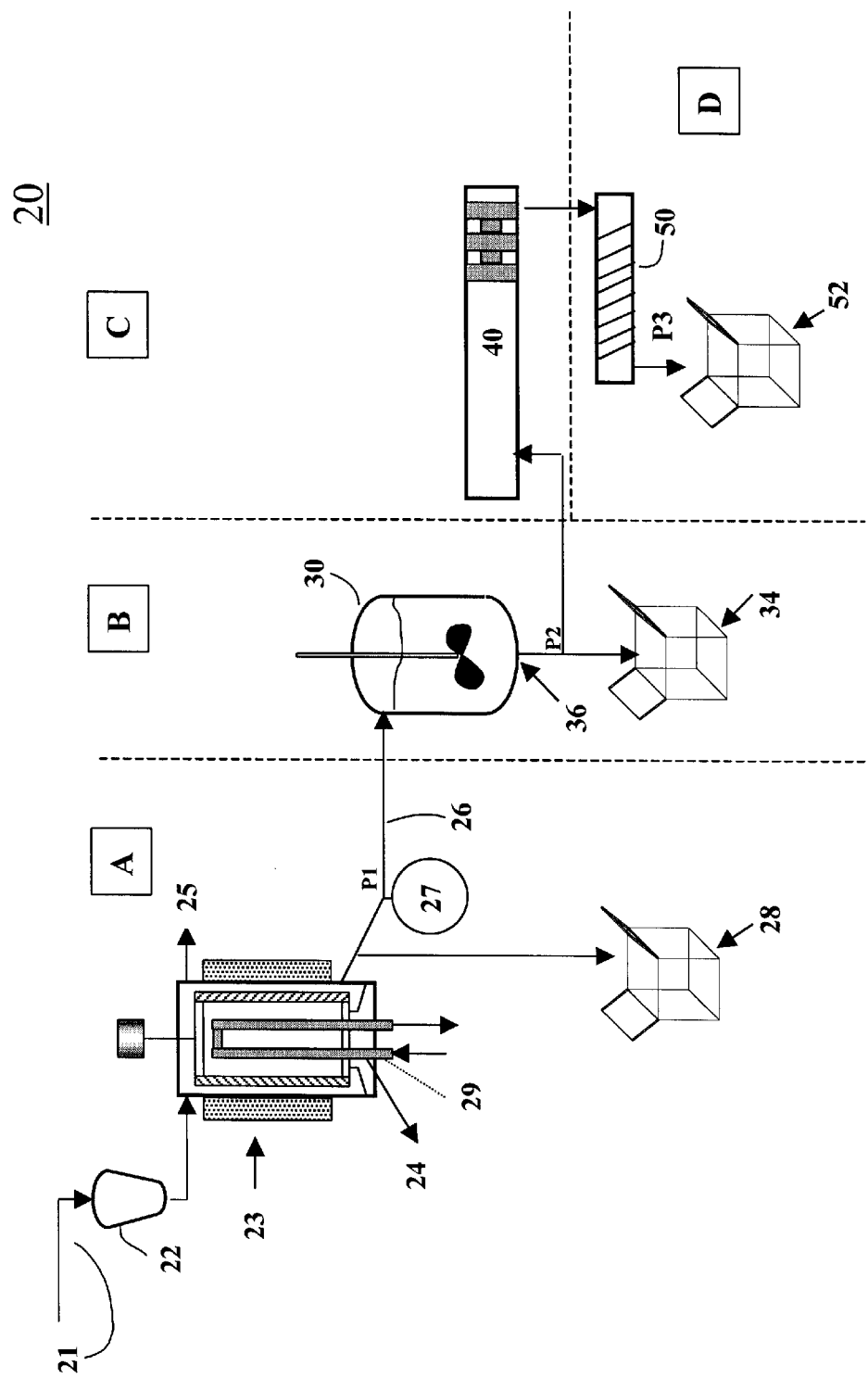
FIG. 2 shows schematically a processing system and apparatus according to an embodiment of the present invention.

In the thin film reactive vacuum processing stage, which is illustrated in FIG. 2 (step A), a wiped-film still or a centrifugal molecular still is used with or without a vacuum degasser, to provide additional reaction of the pre-gel to form a high molecular weight pre-gel and to strip water yielded by the condensation reaction in the still. A Coriolis flow meter may be configured to function as a viscometer and used for on-line measurement of viscosity. An example of such a flow meter is sold by Micro Motion Inc., Boulder, Colo. A target viscosity was established that corresponds to known reaction conversions. The power consumption of the wiper motor in a wiped-film still was indicative of viscosity and extent of reaction. Performing the reaction in a rheometer is one method to establish the magnitude and rate of viscosity increase. The viscosity molecular weight is indicative of the extent of cross-linking as the gel point is approached. Viscosity and reaction extent is controlled to a target by adjusting still feed rate, still surface temperature or residue temperature, or the amount of polyol added to the pre-gel still feed mixture to limit reaction.

The term "low molecular weight pre-gel" refers to the weight average molecular weight of the repeat units that are formed during the reaction in the condensation polymerization batch reactor stage. Low molecular weight pre-gels are in the range of from about 1000 to about 4000 weight average molecular weight, more preferably from about 1000 to about 3000 weight average molecular weight and most preferably from about 1000 to about 2000 weight average molecular weight.

The term "high molecular weight pre-gel" refers to the weight of the additional condensation reaction of the repeat units in a continuous thin film reactive vacuum processing stage. High molecuar weight pre-gel are in the range of from about greater than 5,000 weight average molecular weight, more preferably greater than 10,000 weight average molecular weight and most preferably greater than 20,000 weight average molecular weight.

The use of excess polyols can be used to aid in stripping of low molecular weight oligomers and may be used to control the reaction. The gel point is affected by the presence of excess polyol. Thus, small amounts of polyol can be combined with the pre-gel feed material as needed to limit or control the conversion in the wiped-film still or centrifugal molecular still. If the process is used for food applications such as gum bases, it is preferable to remove unreacted aliphatic polyfunctional acid, long chain aliphatic carboxylic acid and lower molecular weight oligomers to reduce the acidic taste and water extractable components. Special provisions in the design must be made for the removal of unreacted acids. The experimental section describes the difficulties created by free aliphatic polyfunctional acid and long chain aliphatic carboxylic acids. Thus, excess polyol may facilitate the collection and removal of unreacted aliphatic polyfunctional acid and long chain aliphatic carboxylic acids and low molecular weight oligomers that may otherwise fowl the still condenser.

In another embodiment, the vacuum processing stage comprises a wiped film still apparatus, a plurality of wiped-film apparati, or an apparatus that generates a thin film by centrifugal force. Wiped film still appartuses and other similar devices are described by Burrows in *Molecular Distillation*, chapter 1, pages 1–12 and chapter 7, pages 135–161, Oxford University Press, London, (1960), and are commercially available from commercial sources such as LCI, UIC or CANSLER.

If the thin film reactive vacuum processing is carried out in a wiped-film short path still (shown in FIG. 5), it may be configured with an internal U-shaped tube condenser on the wiped film still. The condenser operates operates most efficiently at 130° C., because at colder condenser temperatures, a mixture of adipic acid/polymer coats the condenser tubes and solidifies. To achieve higher temperatures, a glycol-water solution can be used in a tempered water system. Additionally, the use of a glycol-water solution increases the boiling point to above 100° C. Alternatively, a still design utilizing an external condenser rather than an internal condenser is also suitable for the thin film reactive vacuum processing stage. Specific designs, such as those manufactured by LCI, are known to handle highly viscous materials (12M–15M cP) and will provide additional conversion and process stability. However, the greatest increase in viscosity occurs within 0.5% of the gel point. Thus, conventional wiped film still equipment designed for lower viscosity is sufficient and much less costly in this invention.

Figure 9:
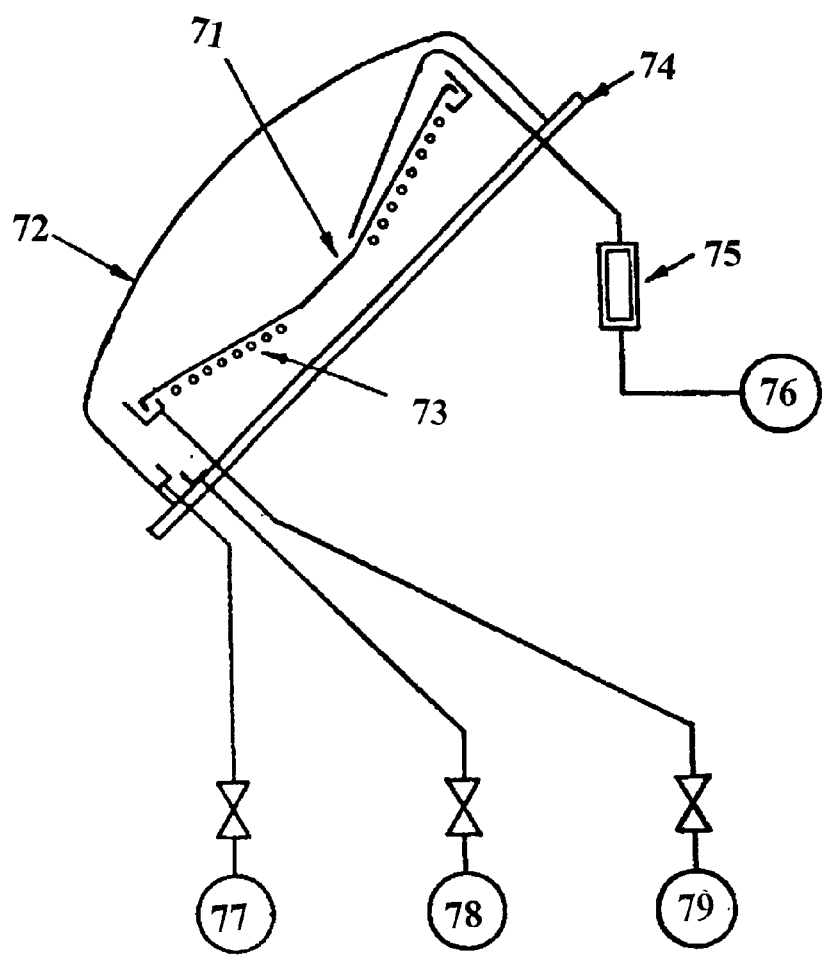
FIG. 9 is a side cross-section perspective view of the centrifugal still apparatus embodiment used in the thin film reactive processing stage in the present invention.

Other suitable equipment for the thin film reactive vacuum process includes a centrifugal molecular still (CMS) (shown in FIG. 9). Some advantages to using this type equipment are (1) that the rotor and other internal components of the centrifugal still are stainless steel and less susceptible to corrosion as compared to stills with aluminum or carbon steel components; and (2) if material cross-links and forms gum in the molecular still, there is minimal risk to the equipment since the only moving part in the centrifugal still is the rotor and the rotor can be removed and cleaned easily, ie., there are no wiping elements that contact the polymer mixture. A laboratory scale still of the same general type is described by Biehler et. al., *Analytical Chemistry*, 2, 638, (1940). Furthermore, a 60-inch "flower-pot" still developed by Hickman is also a suitable still for the process herein. Centrifugal molecular stills based on the Hickman designs are described by Hickman, K. C. D., *Industrial Engineering Chemistry*, 39, 686, (1947), and manufactured by Myers Vacuum Repair Service, Inc., Kittanning, Pa.

The above wiped film still apparatuses or centrifugal film still apparatuses may also be configured with or without a degasser. Suitable degassers include spray and tray degassers, both of which are well known and described by Burrows in chapter 7, page 135–138. Preferred degasser pressure ranges are less than about 100 mmHg, more preferably from about less than 10 mmHg and most preferably from about less than 5 mmHg (5 Torr).

In the vacuum processing stage the high molecular weight pre-gel is formed by condensation polymerization of a low molecular weight pre-gel to within from about 2% to about 0.5% of the gel point conversion of the composition, more preferably to within about 1% of the gel point conversion of the composition, most preferably to within about 0.5% of the gel point conversion of the composition.

The vacuum processing stage condensation reaction for the high molecular weight pre-gel is carried out at temperatures of from about 120 to about 300° C., more preferably from about 120° C. to about 200° C. and most preferably from about 140° C. to about 180° C. Preferred vacuum processing pressure ranges are from about less than 20 Torr, more preferably less than 1 Torr and most preferably less than 200 mTorr. Preferred time ranges for the vacuum processing stage condensation reaction are from about 0.5 seconds to about 5 minutes, more preferably from about 2 seconds to 1 minute and most preferably from about 15 seconds to about 30 seconds.

In another embodiment, the process involves discharging the high molecular weight pre-gel from the vacuum processing stage and crosslinking by curing in a container.

In another embodiment, the process comprises directing the high molecular weight pre-gel from the vacuum processing stage to a continuous stirred tank reactor and further reacting the high molecular weight pre-gel to within preferably about 0.5% of the gel point of the composition. This embodiment is exemplified in FIG. 2 (Step B).

The reaction in the stirred tank reactor allows for additional cross-linking or "curing". In addition to providing a uniform, well mixed feed, the tank will serve as a ballast for feed of an optional embodiment employing an extruder. The tank must be designed to handle very high viscosity and accidental gel formation, and the viscosity of pre-polymer in the tank is controlled by monitoring agitator power consumption and by regulating vacuum level, tank level, temperature or nitrogen purge rate on the tank.

Within this embodiment, the polyester gel is formed by allowing time for the material to cure so that an equilibrium water concentration is established, or by use of a still that can handle gel formation on the still itself, or by an optional reaction in an extruder at high temperature. The high molecular weight pre-gel in the stirred reactor is an ideal feed for the optional reactive extrusion step since significantly less water removal is required when a high molecular weight pre-gel is used versus a low weight pre-gel. A significant reduction in the size, the cost and the L/D of the extrusion equipment required for gel formation is realized.

In another embodiment, the process comprises directing high molecular weight pre-gel from the stirred tank reactor into a container and crosslinking by curing at a specified temperature and time period.

A suitable stirred tank reactor can be found in *Principles of Polymerization*, at page 132. Suitable reaction temperatures for the stirred tank reactor are from about 80° C. to about 160° C., preferably from about 100° C. to about 140° C. Suitable reaction times for the stirred tank reactor are from about 0.1 hour to about 1 hour. This step is generally carried out at atmospheric pressure since it generally follows the vacuum processing step. However, vacuum can be used if desired to minimize temperature and reaction time. Suitable vacuum pressure ranges are from about 1 to about 200 mmHg.

The application of heat is not required to crosslink or cure. i. e., curing can take place immediately while the pre-gel is at a curing temperature of from about 40° C. to about 90° C. However, if heat is applied, it is preferable that the temperature range is 25° C. to 150° C., more preferably from about 25 to about 100° C., and most preferably from about 25° C. to about 60° C. The curing time ranges, where heat is applied, are from about 10 minutes to about 24 hours, more preferably from about 1 hour to about 12 hours, and most preferably from about 10 minutes to about 1 hour. Use of the vacuum process of the invention significantly reduces the amount of time required to cure the product since a high molecular weight pre-gel is utilized in the cure step.

Suitable containers for crosslinking the pre-gel include a box, drum, tray, or molds formed from a polyester, polyolefin, polyether, cellulose-based, metal, or a combination thereof. Other suitable containers include a tote or bag, which can be prepared from materials such as polyester, polyether, polyolefin, or a combination thereof.

In yet another embodiment, the high molecular weight pre-gel from the stirred tank reactor may be extruded or continuously processed at a temperature and time period to form a crosslinked branched polyester gel.

In yet another embodiment, the high molecular weight pre-gel from the vacuum processing stage may be extruded or continuously processed at a temperature and time period to form a crosslinked branched polyester gel.

Preferred processing temperatures for the above embodiments are from about 60 to about 300° C., more preferably from about 80 to 250° C. and most preferably from about 90 to about 185° C. Suitable time ranges in this embodiment are from about 10 seconds to about less than 0.5 hours, preferably from about 10 seconds to about 10 minutes, more preferably from about 30 seconds to about 5 minutes and most preferably from about 45 seconds to about 2 minutes.

Extrusion may be carried out in a single screw or twin screw extruder such as Werner Pfleiderer extruders. Other suitable equipment includes Readco continuous processors, Sigma Blade Mixers, Brabender Plastographs and the like. The Readco processors are especially preferred due to the much lower cost when compared to conventional extruders. The reduced L/D in the Readco processor does not present a problem when a high molecular weight pre-gel is used as the feed for the reactive extrusion step.

In yet another embodiment, the crosslinked polyester gel from the extruder may be processed in a vibratory feeder or an additional extruder to lower the temperature of the crosslinked polyester gel. Preferred temperature ranges are from about 25° C. to about 180° C., more preferably from about from about 60° C. to about 150° C. and most preferably from about 80° C. to about 120° C. This embodiment is set forth in FIG. 2 (Step D).

If an additional extruder is used in the temperature lowering process, the extrudate is cooled in a jacketed extruder for two reasons. First, because the reactive extrusion in FIG. 2 (Step C) is carried out at temperatures as high as 300° C., the product will oxidize on contact with air. If the product is used in food applications, oxidation affects the taste and imparts an odor to the product. Furthermore, the product will hold heat and continue to oxidize for hours since the heat transfer characteristics of the product are poor. Second, product that is cooler than 90° C. can be packaged in corrugated boxes with plastic liners with significant savings over hot-melt containers. The temperature lowering process can alternatively be carried out in a vibratory feeder to cool and convey the flake product that is produced. The flake product could be packaged or compounded with other materials prior to packaging. It should be noted that a vibratory feeder can be used in combination with an extruder to cool the product as described above.

In another embodiment, the cooled crosslinked polyester gel may be directed to a product container and the container maintained at temperature for a period of time.

The crosslinked product is preferably maintained at temperatures of from about 25° C. to about 150° C., more preferably at from about 25° C. to about 150° C., and most preferably from about 40° C. to about 60° C. Preferred time ranges for maintaining the crosslinked product in the container are from about 10 minutes to about two weeks at 30 to 150° C., more preferably time from 30 minutes to 1 day at 60 to 150° C. and most preferably from about 1 to 12 hours a from about 90 to about 120° C.

Suitable containers for maintaining the crosslinked polyester gel include a box, drum, tray, or molds formed from a polyester, polyolefin, polyether, cellulose-based, metal, or a combination thereof. Other suitable containers include a tote or bag, which can be prepared from materials such as polyester, polyether, polyolefin, or a combination thereof. A plastic bag liner is also a suitable product container for the crosslinked polyester gel if the temperature of the crosslinked gel is below 95° C.

In another embodiment, unreacted repeat units and/or low molecular weight reaction by products or oligomers may be removed by distillation in the vacuum processing stage, thereby resulting in an increase in molecular weight by intercondensation polymerization. Preferably, at least 50% by weight of unreacted repeat units and/or low molecular weight reaction by products or oligomers are removed, more preferably at least 80% by weight unreacted repeat units and/or low molecular weight reaction by products or oligomers are removed, most preferably at least 90% by weight unreacted repeat units and/or low molecular weight reaction by products or oligomers are removed.

In another embodiment ,the pre-gel composition comprises reacting repeat units of from (1) at least one polyol having three or more hydroxyl groups or ester thereof; and (2) at least one aliphatic or aromatic polyfuntional acid or ester thereof or a mixture thereof.

Within this embodiment the aliphatic or aromatic polyfunctional acid or ester thereof has two functional groups.

In another embodiment, the pre-gel composition comprises reacting repeat units of from at least (1) one polyol having two or more hydroxyl groups or ester thereof; and (2) at least one aliphatic or aromatic polyfunctional acid or ester thereof or a mixture thereof having at least three functional groups.

Within this embodiment, the aliphatic or aromatic polyfunctional acid or ester thereof has three functional groups.

In another embodiment, the pre-gel composition comprises reacting repeat units formed from (1) at least one polyol having three of more hydroxyl groups or ester thereof; (2) at least one aliphatic or aromatic polyfunctional acid, or ester thereof or mixture thereof, and (3) optionally at least one long chain aliphatic carboxylic acid or ester thereof or an aromatic monocarboxylic acid or ester thereof, Within this embodiment, the aliphatic or aromatic polyfunctional acid or ester thereof has two functional groups.

In yet another embodiment, the pre-gel composition comprises reacting repeat units formed from (1) at least one polyol having two of more hydroxyl groups or ester thereof; (2) at least one aliphatic or aromatic polyfunctional acid, or ester thereof or mixture thereof having at least three functional groups; and (3) optionally at least one long chain aliphatic carboxylic acid or ester thereof or an aromatic monocarboxylic acid or ester thereof.

Within this embodiment, the aliphatic or aromatic polyfunctional acid or ester thereof has three functional groups.

In the above embodiments, the number of hydroxyl groups or ester on the polyol may be two or more, and the number of functional groups on the long chain aliphatic or aromatic polyfunctional acid or ester may be three or more. Alternatively, the number of hydroxyl groups or ester on the polyol may be three or more, and the number of functional groups on the long chain aliphatic or aromatic polyfunctional acid or ester may be two or more. In yet another alternative, the number of hydroxyl groups or ester on the polyol may be three or more, and the number of functional groups on the long chain aliphatic or aromatic polyfunctional acid or ester may be three or more. In counting the number of functional groups, these are functional groups that react with the hydroxyls or ester thereof. Any of the above combinations or any variation thereof will result in the desired pre-gel of the invention. However, the desired pre-gel will not be obtained if the number of hydroxyl groups or ester on the polyol is two and the number of functional groups on the long chain aliphatic or aromatic polyfunctional acid or ester is two. Other monomers may be added during the reaction process without detrimentally affecting the production of the pre-gel.

In another embodiment, the pre-gel composition further comprises repeat units formed from at least one long chain aliphatic carboxylic acid or aromatic monocarboxylic acid or ester thereof or mixture thereof.

In another embodiment, the pre-gel composition further comprises repeat units formed from at least one long chain aliphatic or aromatic monocarboxylic acid.

In another embodiment the pre-gel further comprises an ionic species, oligomers or derivatives of a polyol, a polyfunctional acid, an alcohol, or mixtures thereof.

In another embodiment, the repeat units are formed from (1) glycerol, (2) adipic acid; and (3) optionally palmitic acid.

Typical polyols are contain 2 to 100 carbon atoms, and have at least two hydroxyl groups, or ester thereof. Preferred polyols include glycerol, pentaerythritol, polyglycol, polyglycerol and the like or mixtures thereof. An even more preferred polyol is glycerol. Suitable esters of glycerol include glycerol palmitate, glycerol sebacate, glycerol adipate, triacetin tripropionin and the like. The polyol is present in the range of from about 20% to about 30% weight of the reaction mixture, more preferably from about 20% to about 26% weight of the reaction mixture.

Preferred aliphatic polyfunctional acids having at least two functional groups include saturated and unsaturated acids containing about 2 to 100, preferably, more preferably 4 to about 20 carbon atoms, or ester thereof and most preferably 4 to 18 carbon atoms. Even more preferred polyfunctional acids include malonic, succinic, tartaric, malic, citric, fumaric, glutaric, adipic, pimelic, sebacic, suberic, azelaic, and the like acids, or mixtures thereof. The most preferred polyfunctional acid is adipic acid. Other polyfunctional acids may be dicarboxylic acids containing a $C_3$ to $C_6$ cyclic structure and positional isomers thereof, and include cyclohexane dicarboxylic acid, cyclobutane dicarboxylic acid or cyclopropane dicarboxylic acid. Preferred aromatic polyfunctional carboxylic acids having at least two functional groups include terephthalic, isophthalic, trimelletic, pyromelletic, and naphthalene 1,4-, 2,3-, and 2,6-dicarboxylic acid. The polyfunctional aliphatic or aromatic acids are present in the range of from about 40% to about 65% weight of the reaction mixture, more preferably from about 44% to about 60% weight of the reaction mixture.

Preferred monohydroxyl alcohols have 1 to 20 carbon atoms, and most preferably 12 to 20 carbon atoms. Typical monohydroxy alcohols include lauryl alcohol, myristyl alcohol, cetyl alcohol, stearyl alcohol and the like. The monohydroxy alcohol is present in the range of from about 0 to about 30%.

The presence of a long chain aliphatic carboxylic acid or aromatic monocarboxylic acid is helpful in controlling the degree of branching of the polyester produced and provides a desirable chewing gum base which has a desirable waxy feeling and excellent chewing characteristics.

Preferred long chain aliphatic carboxylic acids or aromatic monocarboxylic acids include those containing about 12 to 26 carbon atoms, or ester thereof, preferably 14 to 18 carbon atoms. Even more preferred long chain aliphatic carboxylic acids may be saturated or unsaturated. Typical saturated long chain aliphatic carboxylic acids include lauric, myristic, palmitic, stearic, arachidic, cerotic, and the like or mixtures thereof. Typical unsaturated long chain aliphatic carboxylic acids include dodecylenic, palmitoleic, oleic, linoleic, linolenic, erucic, and the like or mixtures thereof. The most preferred long chain aliphatic carboxylic acid is palmitic acid. Preferred aromatic monocarboxylic acids include benzoic acid, naphthoic acid and substituted naphthoic acids. Suitable substituted naphthoic acids include naphthoic acids substituted with linear or branched or branched alkyl groups containing 1 to 6 carbon atoms, such as 1-mehtyl-2-naphthoic acid and 2-isopropyl-1-naphthoic acid. The long chain aliphatic carboxylic acid or aromatic monocarboxylic acids is present in the range of from about 0% to about 70% weight of the reaction mixture, more preferably from about 15% to about 30% weight of the reaction mixture.

In addition to the $C_3$ to $C_5$ polyol component, additional polyols, ionic species, oligomers or a derivative thereof may be used if desired. The amounts of these additional glycols or polyols may range from about 0% to about 50% weight percent of the reaction mixture. Preferred additional polyols or their derivatives thereof include propylene glycol, 1,3-butanediol, 1,3-propanediol, 1,4-butanediol, 1,6-hexanediol diethylene glycol, 1,4-cyclohexanediol, 1,4-cyclohexanedimethanol, neopentyl glycol, triacetin, trimethylolpropane, pentaerythritol, cellulose ethers, cellulose esters, such as cellulose acetate, sucrose acetate isobutyrate and the like. Preferred ionic species include calcium salts such as calcium carbonate, sodium chloride, magnesium sulfate, magnesium oxides, aluminum oxides, calcium sulfate, clays, talcs, aluminum silicates, titanium dioxides and the like.

In another embodiment, the pre-gel may comprise at least two pre-gel compositions formed from reacting the above polyester precursor repeat units in separate reactors to produce in a first reactor a first composition comprising a pre-gel having carboxyl-rich end groups and to produce in a second reactor a second composition comprising hydroxyl-rich end groups, and combining the first and second compositions to form a high molecular weight mixture that can be further processed to form a crosslinked branched polyester gel.

Within this embodiment, at least two pre-gel compositions may be simultaneously fed into the thin film vacuum processing stage and the first and second pre-gel compositions mixed in the thin film vacuum processing stage to form a high molecular weight pre-gel. Alternatively, the first and second pre-gel compositions can be separately processed in a thin film vacuum processing stage to remove low molecular weight oligomers prior to simultaneously feeding the at least two pre-gel compositions into the thin film vacuum processing stage for mixing and formation of a high molecular weight pre-gel.

In an alternative embodiment, the mixture of the first and second pre-gel compositions may be further processed in a thin film vacuum processing after they are initially mixed in the thin film vacuum processing stage.

It is well known to the person of ordinary skill in the art that to achieve a composition having carboxyl-rich and/or hydroxyl-rich end groups, a molar excess of the commensurate components must be utilized.

A catalyst is not required for the esterification and polycondensation steps used to prepare the crosslinked branched polyesters of this invention. Titanium catalyst such as titanium alkoxides are frequently used as ester exchange and polycondensation catalysts but titanium imparts undesirable discoloration to the polyesters of this invention. The presence of zinc and aluminum salts, excluding oxides, that may be dissolved by water in saliva will detract from the flavor of the polyester, if the polyester is used in food applications, such as a chewing gum base.

The terms "prepolymer" or "pre-gel" are defined herein as the state of the resin prior to gelation, that is prior to forming a gel or prior to reaching the gel point. At conversions well before the gel point, the resin is generally a liquid melt of low order polymers or oligomers. The term "gel point" is often described as the point wherein crosslinking is evident by the occurrence of gel formation or gelation in the polmerization process. As the reactants begin to react and give off water, the molecular weight of the chains begins to increase and the chains begin to branch. As the condensation reaction continues and water is given off, the molecular weight begins to increase even more rapidly and bonds form between branched chains to form crosslinked structures. At some point during the progression of the reaction, the molecular weight becomes sufficiently large such that a gel begins to form. Such a gel has limited solubility in common organic or aqueous solvents. As the gel continues to react and water is given off, crosslinking increases and the consistency of the gel resembles a hard rubber and eventually a glass-like solid. When the gel point is reached in the polymerization process, one observes the visible formation of a "gel" or "insoluble polymer fraction."

The term "gel point" can also be described as the extent of reaction point at which the reaction system loses fluidity as measured by the failure of an air bubble to rise in the reaction mixture.

In a preferred embodiment, from about 75 to 95% of the total water is removed during the reaction to form the pre-gels. The remaining water, 5 to 25%, is removed during post reaction to gelation.

Figure 3:
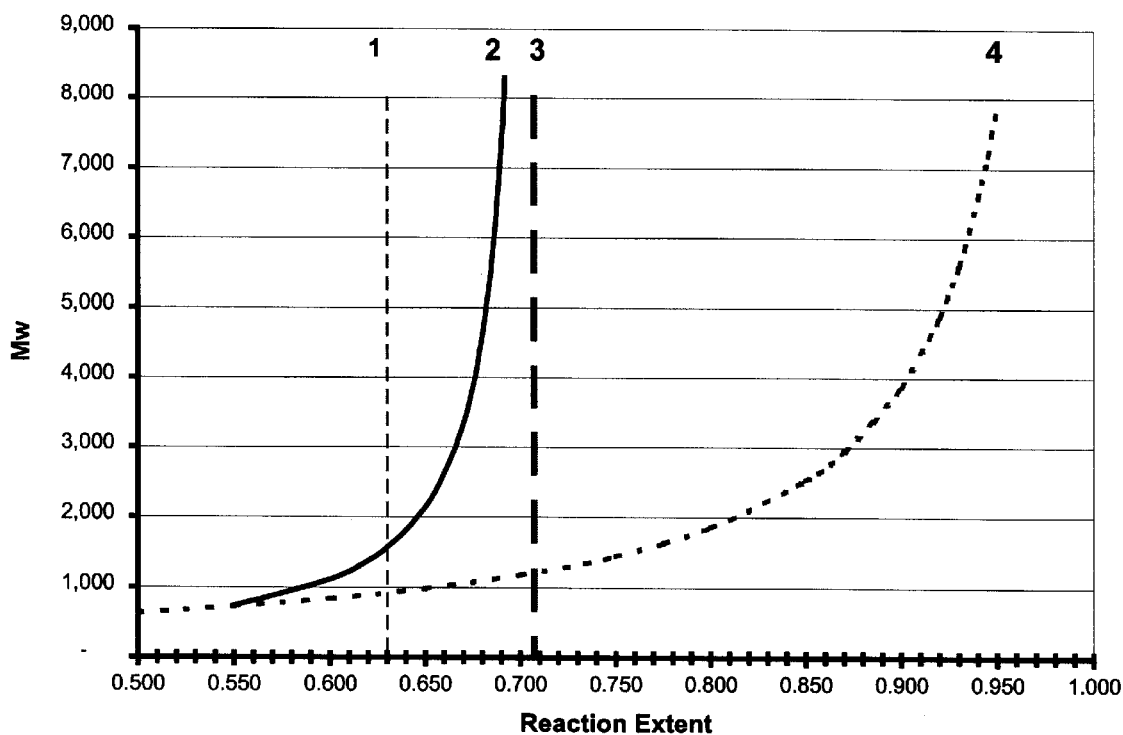
FIG. 3 graphs the effect of conversion for the crosslinked polyesters obtained in the present invention and the prior art linear polyesters, plotted by the average molecular weight buildup.
Figure 4:
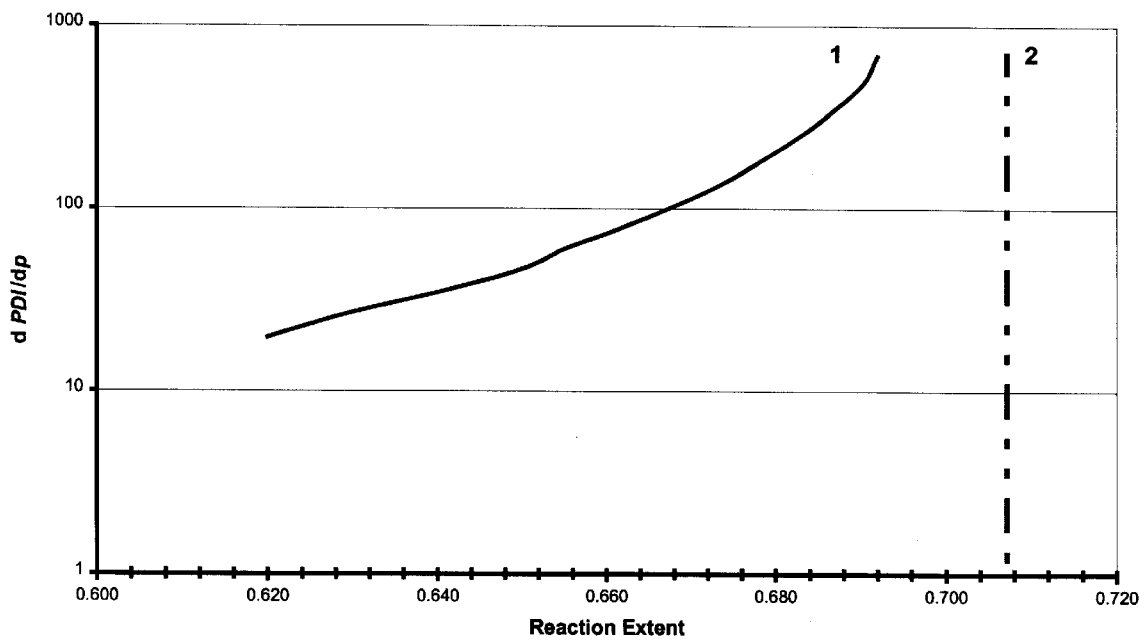
FIG. 4 graphs the effect of the significant increase in polydispersity near the gel point.

There is a significant increase in polydispersity (PDI) that corresponds to molecular weight build up as conversion approaches the gel point. Refer to FIGS. 3 and 4 for plots of molecular weight vs. conversion and derivative of polydispersity versus conversion for the adipic acid/glycerol formulation. The derivative of polydispersity increases at a rate that is more than exponential as the gel point is approached. This behavior results in a system in which the pre-polymer is fluid enough to be processed using CMS or wiped film stills within 1% of the gel point. Additionally, it is assumed that mass transfer of water through the thin film is not the limiting process step when the viscosity is low (less than 50 poise).

However, of specific advantage, is the reduction in mass transfer across the film as the fluid becomes viscous and the thickness of the film is increased (mass transfer coefficient is inversely proportional to the product of viscosity and the cube root of molecular weight as approximated by the Polson equation.). Thus, the mass transfer limitation acts, to some extent, as a self-limiting control for conversion. In the thin film reactive vacuum process stage the residence time is between about 15 seconds to about 30 seconds. This is the reason why, unlike the extruder, conversion increases in a stable fashion as still temperature is increased, and the conversion can be controlled. The film thickness in the extruder, while not necessarily uniform, is fixed by the wiping tolerances of the unit. Thus, even viscous material will have roughly the same film thickness as the thin material. When temperature is increased in the extruder the process stability and product characteristics are changed.

The term "acid value," also known as acid number, is determined by weighing a sample of the crosslinked branched aliphatic biodegradable polyester and titrating it with dilute potassium hydroxide in the presence of an indicator or potentiometer. The acid value calculations were made based on the milligrams of potassium hydroxide/gram of crosslinked branched aliphatic biodegradable polyester. Preferred acid values are from about 10 to about 500 KOH/g polymer.

Acid values may be used to determine the average molecular weight of the low molecular weight and/or high molecular weight pre-gel. In general, as the reaction progresses the acid value decreases and the molecular weight of the pre-gel increases. Alternative, standard viscosity test known in the art may be used to determine the average molecular weight of the low molecular weight and/or high molecular weight pre-gel.

Figure 1:
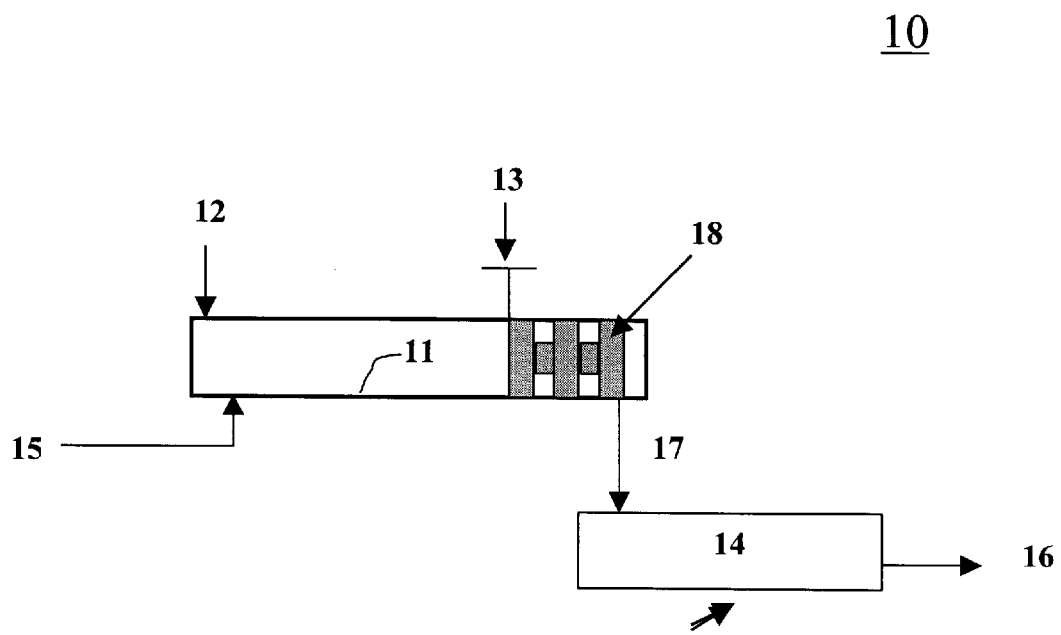
FIG. 1 shows the prior art reactive extrusion process.

Referring to FIG. 1, a schematic of the prior art reactive extrusion process 10 comprising a continuous processor 11 containing blades 18, a first feed port inlet 12 were nitrogen is added, located part way along the upper body of the continuous processor 11, a vent port 13 located on the opposite end of the upper body of the continuous processor 11 and a second material supply feed inlet 15 located on the side of the continuous processor 11, when the liquid injection port is used for the feed. The feed discharged from outlet 17, which is located on the lower body of the continuous processor 11 at the opposite end from the second feed inlet 15, is directed into a vibratory feeder 14 for cooling. The cooled material is discharged from outlet 16 of the vibratory feeder 14 into an appropriate vessel.

Referring now to FIG. 2, the present invention comprises a process 20 for reacting polyester repeat units to produce a pre-gel comprising Steps A, B and C. Step A comprises reactive extrusion in a thin film reactive vacuum processing apparatus 23 having a feed material supply line 21, an optional degasser 22, an outlet 24 for discharging distillate or recycled material, a vacuum system outlet 25, a U-tube condenser 29, and an outlet 26 for discharging feed material residue "P1". The thin film vacuum processing apparatus may also be configured with a viscosity or mass flow controller 27. The material "P1" discharged from outlet 26 may be directed into tempered container 28, or further processed in Step B in a stirred tank reactor 30. The stirred stank reactor has a discharge outlet 36. After processing the material feed in the stirred tank reactor 30, a product "P2" is produced. The product "P2" is discharged from outlet 36 and may be directed into a tempered container 34, or directed to Step C for further processing in an extruder or continuous processor 40 to crosslink the material. After processing in the extruder or continuous processor 40 the crosslinked material is optionally processed in Step D in a vibratory feeder or an additional extruder 50 to lower the temperature of the crosslinked material. The cooled material "P3" from 50 is directed into a container 52.

An alternative embodiment (not shown) in FIG. 2 comprises discharging the material "P1" in Step A from outlet 26 directly into the extruder or continuous processor 40 in Step C to crosslink the material "P1". The crosslinked material "P1" may optionally be processed In Step D in the vibratory feeder or additional extruder 50 to lower the temperature of the material "P1". The material "P1" from the vibratory feeder or extruder 50 can also be directed into container 52.

FIG. 3 shows a plot of the molecular weight buildup for a crosslinked polyester of the present invention (glycerol and adipic acid composition) as compared to the molecular weight buildup for a linear polyester having a similar composition (propylene glycol and adipic acid). The plot clearly shows that the molecular weight buildup of the crosslinked polyester occurs more rapidly as the gel point is approached.

FIG. 4 shows a plot of the derivative of polydispersity for the present invention crosslinked polyester of an adipic acid and glycerol composition. The plot demonstrates that the increase in polydispersity is greater than exponential near the gel point.

Figure 5:
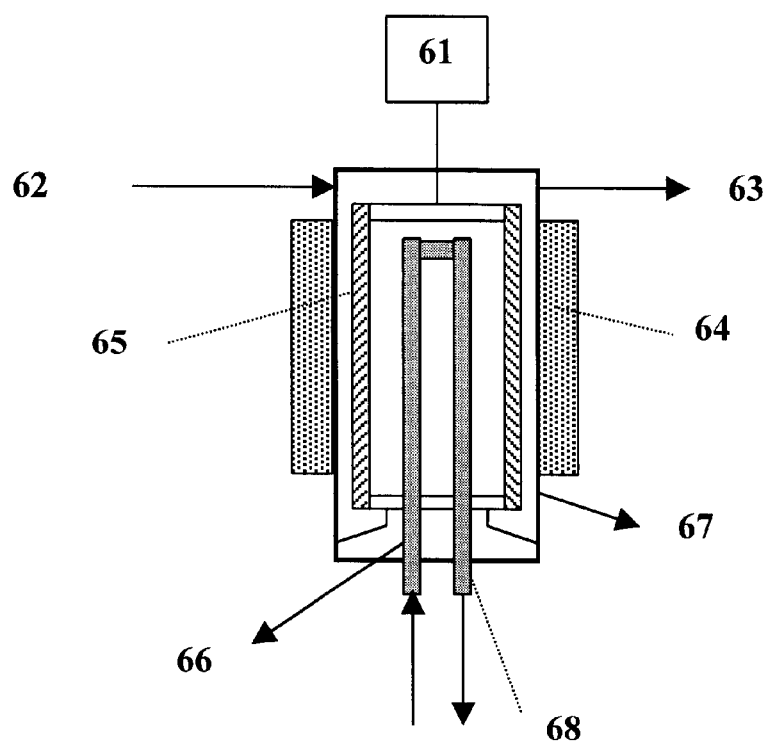
FIG. 5 shows a wiped-film short-path still apparatus according a preferred form of the present invention.

Referring now to FIG. 5, the present invention comprises a wiped film still 60 having a motor and drive system, a feed inlet/feed distributor outlet 62, a connection for a vacuum system 63, a jacket/heating mantle 64, a wiper basket 65, wherein the wipers may be of fixed or variable tolerance and spring loaded or loaded by centrifugal force, a distillate discharge outlet 66, a product outlet 67 and a U-tube condenser 68, which may be located externally or internally on the wiped film still 60. The U-tube condenser 68 may be configured with baffles (not shown) for short path distillation.

Figure 6:
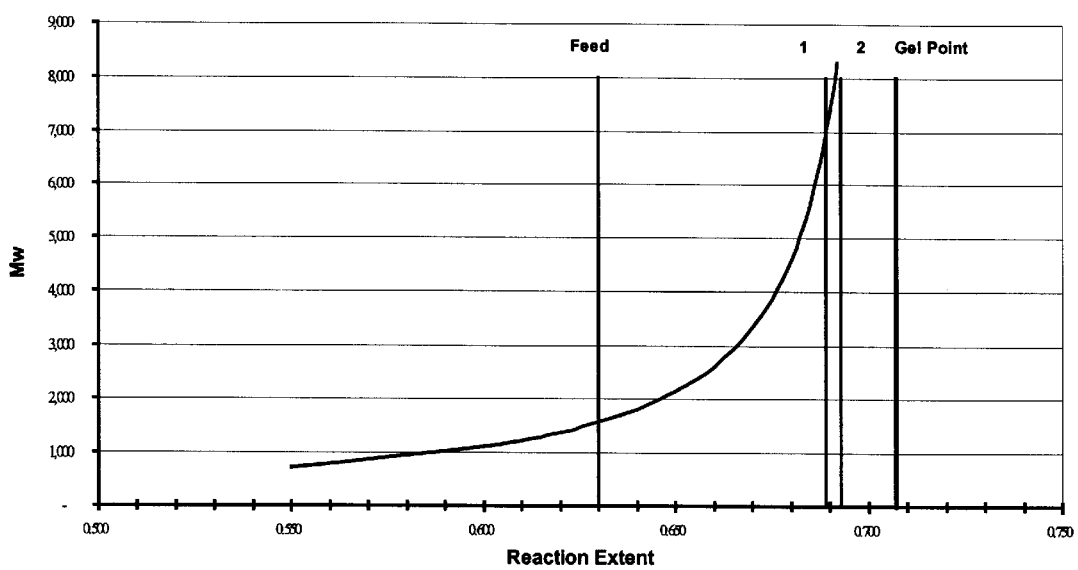
FIG. 6 graphs the experimental results from Example 1's run in a Pope still apparatus.

FIG. 6 shows a plot shows experimental results for a glycerol/adipic acid polymer in a Pope still run.

Figure 7:
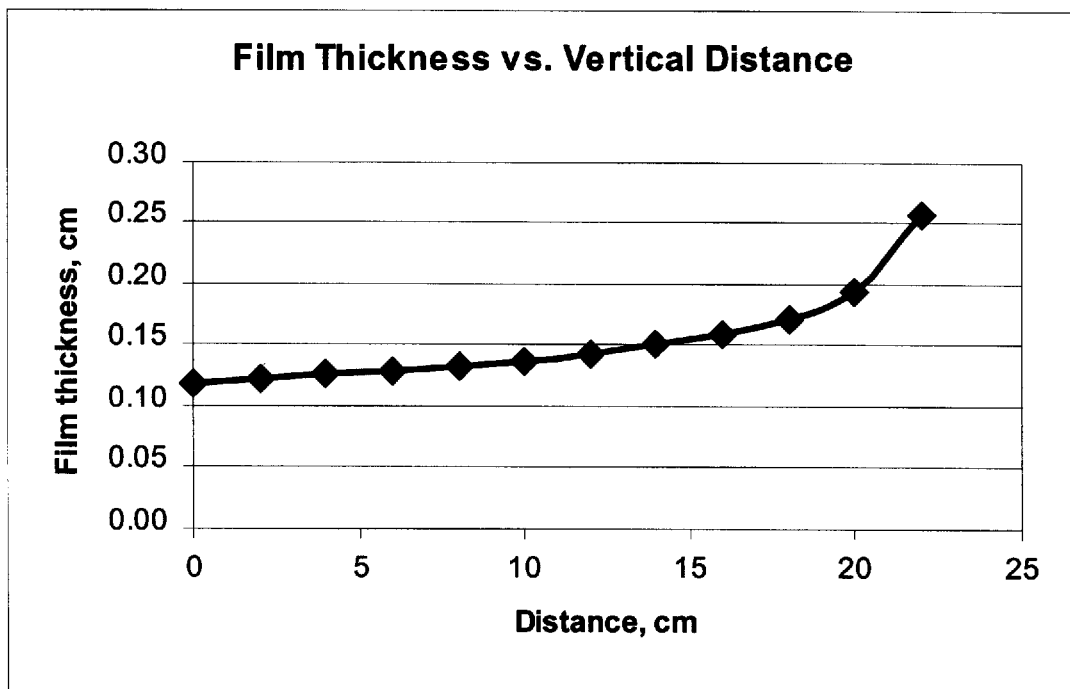
FIG. 7 graphs the effect of the vertical distance traveled by falling film in a wiped film still on film thickness.

FIG. 7 shows a plot of film thickness versus vertical distance traveled by falling film in a wiped film still. The calculations for this plot were made using the reaction model presented in Example 1.

Figure 8:
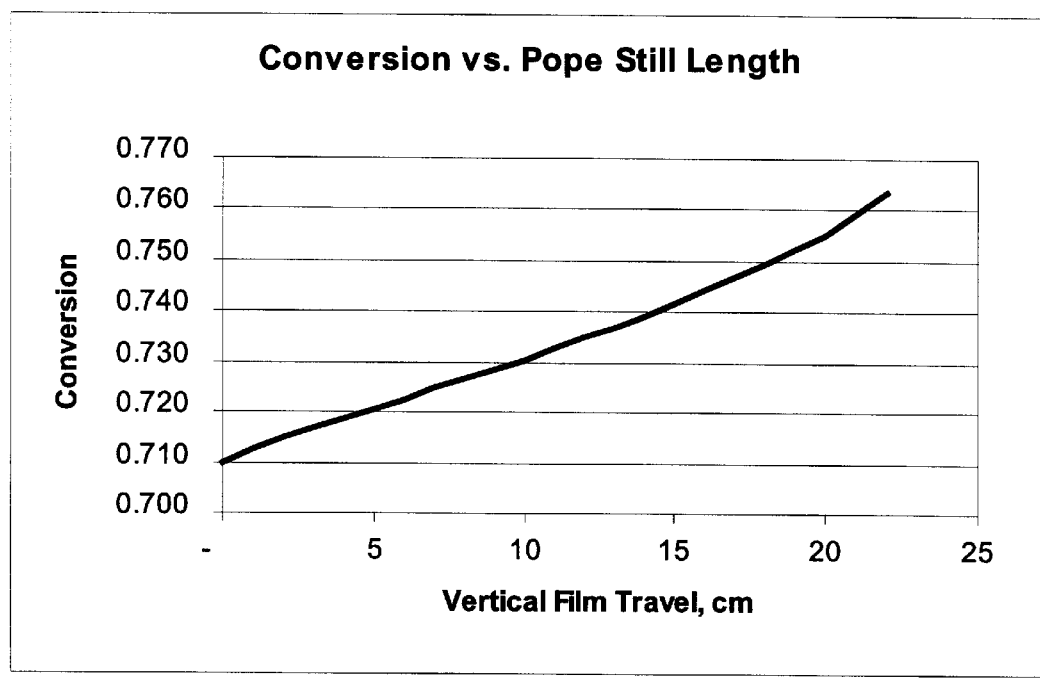
FIG. 8 graphs the effect of the vertical distance traveled by falling film in a Pope still on conversion.

FIG. 8 shows a plot of conversion versus vertical distance traveled by falling film. The calculations for this plot were also made using the reaction model presented Example 1.

Referring now to FIG. 9, the present invention comprises centrifugal still 70 wherein pre-gel feed material is supplied to an opening (not shown) near the center of the rotor 71, wherein the feed material is formed into a thin film by the feed assembly and centrifugal force created by the rotation of the of the rotor 71. Heat is applied to the rotors 70 by radiant electric heating elements 73. The feed material that is stripped or distilled is condensed 72 on the interior surface of the dome of the condenser 72. The vapors that are not condensed are removed from the system by a vacuum pumping system (not shown). The baseplate 74 supports the entire still assembly and forms a vacuum seal with the interior surface of the dome of the condenser 72. A sight glass/flowmeter 75, is optionally provided in the feed line of pump-rotor 76. The distillate is collected by gravity and discharged by a distillate pump 77. The residue, i.e., not distilled material, is collected and discharged by the residue pump 79. Any material that collects or overflows to the baseplate 74 is collected and removed from the base drip pump 78. In Example 2, the residue is the desired pre-gel product that has increased its molecular weight by controlled reaction in this continuous thin film vacuum processing stage in the centrifugal still 70. Unlike the prior art processes, the conversion in the above centrifugal still is easily controlled.

Figure 10:
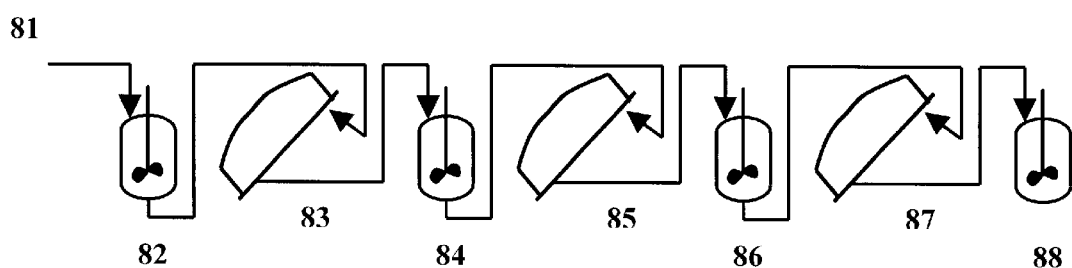
FIG. 10 shows a continuous flow diagram equivalent to the multi-pass centrifugal experiment performed on a single unit in Example 2.

Referring now to FIG. 10, the present invention illustrates graphically a continuous process configuration 80 equivalent to the experiment in Example 2. A pre-gel formulation feed 81 from Example 2 was processed in multiple passes on the same centrifugal still 83, 85 and 87. Each vacuum process pass and the corresponding cure time on centrifugal stills 83, 85 and 87 results in a controlled increase in molecular weight (conversion of the pre-gel by condensation polymerization). The reactors 82, 84, 86 and 88 represent the holding process for the pre-gels being processed in multiple passes. In Example 2, a simple storage container without agitation was utilized. The first stirred tank reactor in the continuous process configuration 80 represents reaction time (or holding time) at modest temperatures prior to the first vacuum processing stage.

In FIG. 10 above, the first reaction stage in the stirred reactor 82 was from about 3 to about 6 hours at 120° C. The first vacuum processing stage on centrifugal still 83 was from about 3 to about 6 hours at 120° C. The second reaction stage in stirred tank reactor 84 was from about 3 to about 6 hours at 120° C. The second vacuum processing stage in a centrifugal still 85 was from about 3 to 6 hours at 120° C. The third reaction stage in stirred tank reactor 86 was about 12 hours at 100° C. The third vacuum processing stage in centrifugal still 87 was about 12 hours at 100° C. The fourth reaction stage in stirred tank 88 was about 12 hours at 100° C.

Figure 11:
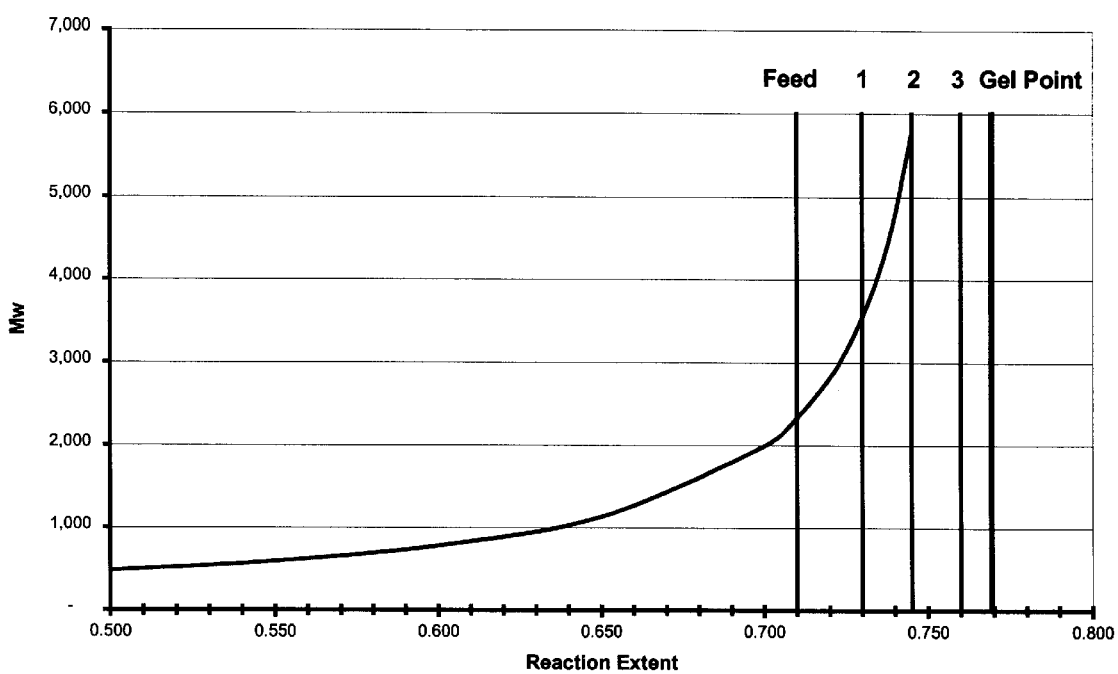
FIG. 11 graphs the effect of reaction extent for the adipic acid/glycerin/palmitic composition in Example 2 on the weight average molecular weight.

FIG. 11 shows a plot of weight average molecular weight versus reaction extent in a centrifugal molecular still for the adipic acid, palmitic acid and glycerin in Example 2 and illustrates conversion data for samples taken in Example 2. The conversion model presented earlier is also graphed on the same chart to illustrate the relationship between molecular weight and conversion.

Biodegradable as used herein is meant to describe an aliphatic polyester that is easily degradable and not highly crystallized. The mechanism of degradation is by de-esterification causing chain cleavage. The de-esterification process can occur either enzymatically, i.e., organisms, or by environmental factors such as exposure to water. The rate of biodegradation of the crosslinked branched aliphatic biodegradable polyesters can be determined by ASTM method D5209 (Determination of Biodegradation of Plastic Materials in the Presence of Municipal Sewage Sludge). The rate of biodegradation should be at least equal to the rate of degradation of kraft paper using the ASTM D5209 procedure. Upon visual observance of the biodegradation of the crosslinked branched aliphatic biodegradable polyester, the biodegradable polyester exhibited low viscosity or a syrup-like consistency.

As previously stated, the crosslinked branched polyesters of the present invention can be used in food applications such as gum base formulations and/or chewing gum formulations and for non-food applications and improved methods of making such materials. In this regard, the polyesters can be used as elastomers and/or elastomeric plasticizers. As part of a gum base, the edible polyesters can comprise from abut 1% to about 80% by weight of the gum base. As part of the chewing gum, the crosslinked branched aliphatic biodegradable polyesters can comprise from about 0.1 to about 70% by weight of the chewing gum.

The crosslinked branched aliphatic biodegradable polyesters can be used in a variety of different chewing gum and base formulations. Chewing gum generally consists of a water insoluble gum base, a water soluble portion, and flavoring agents.

In one embodiment, a gum base is made according to the above described process and may comprise the step of:
c) forming a crosslinked gel by reactive extrusion of the high molecular weight pre-gel of step b).

In one embodiment, a gum base is made according to the above-described processes comprising reacting repeat units formed from (1) at least one polyol having at least three or more hydroxyl groups, or esters thereof; (2) at least one aliphatic polyfunctional acid or ester thereof; and (3) optionally at least one long chain aliphatic carboxylic acid or ester thereof.

Within this embodiment, the aliphatic polyfunctional acid or ester thereof has two functional groups.

In another embodiment, a gum base is made according to the above-described processes comprising reacting repeat units formed from (1) at least one polyol having at least two or more hydroxyl groups, or esters thereof; (2) at least one aliphatic polyfunctional acid or ester thereof having at least three functional groups; and (3) optionally at least one long chain aliphatic carboxylic acid or ester or mixture thereof.

Within this embodiment, the aliphatic polyfunctional acid or ester thereof has three functional groups.

Within the above embodiments, the gum base may be aliphatic and biodegradable.

In another embodiment, any branched aliphatic biodegradable polyester or gum base described above exhibits a high degree of crosslinking and can be defined by comparing the highly crosslinked branched aliphatic polyesters of the instant invention to thermoset polymers. Thermoset polymers can be classified as "A-," "B-," and "C-stage" polymers according to the extent of the reaction, "p" as compared to the extent of the reaction at gelation, "pc." The polymer is an "A-stage" polymer if "p" is less than "pc." The polymer is a "B-stage" polymer if the system is close to the gel point, "pc." The polymer is a "C-stage" polymer if the polymer is well past "pc." The "A-stage" polymer is soluble and fusible. The "B-stage" polymer is still fusible but is barely soluble. The "C-stage" polymer is crosslinked and both infusible and insoluble. The crosslinked branched aliphatic biodegradable polyesters of the present invention fall between the "B- and C- stages" of the thermoset polymer classification. (See page 127 of Odian, *Principles of Polymerization*, referenced above). Preferred molecular weight ranges for branched aliphatic biodegradable polyester exhibiting high crosslinking is from about 100 K to greater than about 1 M, more preferably from about greater than 100 K to about 10 M. "K" means one thousand and "M" means one million.

In another embodiment, the gum base has a molecular weight range of from about 100 K to greater than about 1 M. This molecular weight range inherently contemplates a high level of crosslinking.

In a preferred embodiment, the gum base may comprise a crosslinked branched polyester gel comprising repeat units formed from (1) glycerol: (2) adipic acid; and (3) optionally palmitic acid.

In an even more preferred embodiment, the gum base may comprise a crosslinked branched aliphatic biodegradable polyester gel comprising repeat units formed from (1) glycerol: (2) adipic acid; and (3) palmitic acid.

In yet another embodiment, the gum base may comprise a crosslinked branched aliphatic biodegradable polyester gel consists of repeat units formed from (1) glycerol: (2) adipic acid; and (3) palmitic acid.

In another embodiment, a chewing gum composition formulated from any of the aforementioned gum bases.

The polyols, aliphatic or aromatic polyfunctional acids, long chain aliphatic carboxylic acids or aromatic monocarboxylic acids, additional units of alcohol, polyol or derivative thereof for the gum bases and compositions are the same as described with respect to the process embodiments.

The insoluble gum base generally comprises elastomers, resins, fats and oils, softeners and inorganic fillers. The gum base may or may not include wax. The insoluble gum base can constitute from about 5 to about 95% by weight of the chewing gum. More commonly, the gum base comprises from about 10 to about 50% by weight of the gum, and in some preferred embodiments, from about 20 to about 35% by weight of the chewing gum.

In another embodiment, the invention provides that the gum base is wax-free, non tacky, or a bubble gum-type base.

In one embodiment, the chewing gum base of the present invention comprises from about 1 to 80% by weight crosslinked branched aliphatic biodegradable polyester, from about 20 to about 60% by weight synthetic elastomer, from about 0 to about 30% by weight natural elastomer, from about 5 to about 55% by weight elastomeric plasticizer, from about 4 to abut 35% by weight filler, from about 5 to about 35% by weight softener, and optional minor amounts (about 1% or less) of miscellaneous ingredients such as colorants, antioxidants, etc.

Synthetic elastomers may include, but are not limited to, polyisobutylene with a GPC weight average molecular weight of about 10,000 to about 95,000 isobutylene-isoprene copolymer (butyl elastomer), styrene-butadiene copolymers having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having a vinyl laurate content of from about 5 to about 50% by weight of the copolymer, and combinations thereof Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of from about 10 to 45%.

If used, natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva, and massaranduba balata.

If used, elastomer plasticizers may include, but are not limited to natural rosin esters, often called estergums, such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations thereof. The preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids, such as stearic, palmitic, oleic and linoleic acids and combinations thereof.

Colorants and whiteners may include FD&C-type dyes and lakes, fruits and vegetable extracts, titanium dioxide and combinations thereof.

The gum base may or may not include wax. An example of a wax-free gum base is disclosed in U.S. Pat. No. 5,286,500, the disclosure herein which is incorporated by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulant, fillers, antioxidants, and other components that provide desired attributes.

The softeners, which are also known as plasticizers and plasticizing agents, generally constitute from about 0.5 to about 15% by weight of the chewing gum. The softeners may include glycerin, lecithin, and combinations thereof. Aqueous sweetener solutions such as those containing sorbitol, hydrogenated starch hydrosylates, corn syrup and combinations thereof, may also be used as softeners and binding agents in chewing gum.

Bulk sweeteners include both sugar and sugarless components. Bulk sweeteners typically constitute from about 5 to about 95% by weight of the chewing gum, more preferably 20 to 80% by weight, and even more preferably, 30 to 60% by weight of the gum.

Sugar sweeteners generally include saccharide-containing components commonly known in the chewing gum art, including, but not limited to, sucrose, dextrose, maltose, dextrin, dried invert sugar, fructose, galactose, corn syrup solids, and the like, alone or in combination.

Sorbitol can be used as a sugarless sweetener. Additionally, sugarless sweeteners can include, but are not limited to other sugar alcohols, such as mannitol, hydrogenated isomoltulose (palatinit), xylitol, hydrogenated starch hydrosylates, malitol, lactitol and the like, alone or in combination.

High intensity artificial sweeteners can also be used in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extrusion may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from about 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide artificial sweetness such as with aqueous sugar or alditol solutions.

If a low calorie gum is desired, a low caloric bulking agent can be used. Examples of low caloric bulking agents include, polydextrose, Raftilose, Raftilin; Fructooligosaccharides (Nutra Flora); Palatinose oligosaccharide, Guar gum hydrosylate (Sun Fiber) or indigestible dextrin (Fibersol). However, other low calorie bulking agents can be used.

A variety of flavoring agents can be used. The flavor can be used in amounts of from about 0.1 to about 15% weight of the gum, and preferably from about 0.2 to about 5% weight. Flavoring agents may include essential oils, synthetic flavors or mixtures thereof, including, but not limited to oils derived from plants and fruits, such as citrus oils, fruits essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

The present invention, can be used with a variety of processes for manufacturing chewing gum. Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, extruding into chunks, or casting into pellets.

Generally, the ingredients are mixed by first softening the gum base and adding it to the running mixer. The gum base may alternatively be softened by heating in an appropriate vessel. Color and emulsifiers can be added at this time.

A chewing gum softener, such as glycerin can be added next along with part of the bulk portion. Further parts of the bulk portion may then be added to the mixer. Flavoring agents are typically added with the final part of the bulk portion. The entire mixing process typically takes from five to fifteen minutes, although longer mixing times are sometimes required.

The following examples are put forth so as to provide one of ordinary skill in the art with a complete disclosure and description of how the process and product claimed herein are made and evaluated and are intended to be purely exemplary of the invention and are not intended to limit the scope of what the inventor regards as their invention. Efforts have been made to insure accuracy with respect to numbers (e.g. amounts, temperature, etc.) but some errors and deviatioms should be accounted for. Unless indicated otherwise, parts are by weight, temperature is in ° C. or is at room temperature and pressure is at or near atmosphere.

Pre Gel Pre-feed Formulation 1: Adipic Acid/ glycerol Pre-gel

To a 1-liter heated resin kettle equipped with agitator, thermometer, and condenser with distillation head, 294 g (9.64 equivalents) of glycerol was added. The glycerol was agitated and heated to about 100° C., and 704 g (9.64 equivalents) of adipic acid was added. After all the adipic acid was added, the batch was heated to 150–200° C. and water taken off at atmospheric pressure. Water began to distill when the temperature of the reaction mixture reached 150 to 160° C. The batch was heated further heated to 160 to 210 ° C., and water collected until a total of 110 g was obtained. The 110 g of water collected was 63% of the theoretical amount.

Pre-gel Feed Formulation 2: Adipic Acid/glycerol/ palmitic Acid Pre-gel (22 wt % Palmitic Acid)

To a 5-liter heated resin kettle equipped with agitator, thermometer, and condenser with distillation head, 1246 g (40.6 equivalents) of glycerol was added. The glycerol was agitated and heated to about 100° C., and 1068 g (4.2 equivalents) of palmitic was added. While maintaining the batch temperature at 100–120° C., 2506 g (34.3 equivalents) of adipic acid was added. The batch was heated to 150–210° C. and water of reaction was collected at atmospheric pressure. Water began to distill when the temperature of the reaction mixture reached 150–160° C. The batch was heated further and water collected until a total of 437 g was obtained. The 437 g of water collected was 63% of the theoretical amount (693 g).

EXAMPLE 1

In two runs, low molecular weight pre-gels converted to 63% of their gel-point, were fed to a 2" Pope wiped-film still (shown in FIG. 5), at a rate of 1.0 to 2.5 mL/min. In the first run, the wiped film still temperature was 146–151° C., and in the second run, the wiped film still temperature was increased gradually from 150° C. to over 200° C. The viscosity build up occurred gradually as the temperature was increased. Operating pressure in the range of 10 to 100 microns was maintained for the first and second runs.

The process was stable and no gel formed at operating temperatures under 200° C. The product was gelled by heating in a flask. The weight average molecular weight ($M_w$) of the pre-gel processed by the wiped film still was determined by GPC to be 6,786 and 8,581 for runs 1 and 2, respectively. The vacuum process yields a molecular weight increase as illustrated in FIG. 6.

TABLE 1

Sample Conditions, GPC Data for Pope Still Runs.

| Parameter | Sample 1 (Pre-gel feed formulation 1) | Sample 2 (Pre-gel feed formulation 1) | Sample 3 (Pre-gel feed formulation 2) |
| --- | --- | --- | --- |
| Sample ID | X22858-037-1 | X22858-037-2 | Not Sampled |
| Feed Material | No Palmitic | No Palmitic | (Palmitic) |
| Still Temperature, ° C. | 146–151 | 151–206 | 185 |
| Condenser Temp., ° C. | 120 | 120 | 130 |
| Water Extract., wt % | 3.7 | 6.5 | Not tested |
| GPC $M_n$ | 1,289 | 1,497 | Not tested |
| GPC $M_w$ | 6,736 | 8,581 | Not tested |
| Conversion* | ~68.9 | ~69.3 | Not tested |

*Gel point was estimated at 70.7% conversion.

Reaction Model

A preliminary model for the reaction in the wiped film still is provided to facilitate an understanding of the stability and reaction characteristics observed in the wiped film still. The primary purpose in the development of the model is to illustrate how the vacuum still provides additional stability and allows for a controlled conversion when compared to the reactive extrusion process. The physical parameters for the Pope still system are shown in Table 2. A feed viscosity of 5 poise was estimated and feed formulation (Sample 3) containing approximately 22% palmitic acid, 52% adipic acid and 26% glycerin by weight was used for this model. The feed formulation is the same as used in Example 2, but is not the same as the formulation used above in Example 1. The feed viscosity was estimated based on rheology data. The following equations presented set forth by Burrows, G., *Molecular Distillation*, Oxford University Press, London, (1960), were used to determine the film thickness, S, and the mean film velocity down the wall of the wiped film still, $u_m$. The transport capability of the wiper blades has been ignored as an assumption in this model.

$$S = \sqrt[3]{\frac{3G\eta}{\pi d \rho^2 g}} \qquad u_m = \frac{\rho g S^2}{3\eta}$$

For the sake of simplicity, a second order reaction is assumed with respect to the adipic acid groups present. The rate equation as a function of concentration is thus—$r_A = k_1 C_A C_B = k_1 C_A^2$ when $C_A$ is roughly $C_B$ and A is limiting. The flow in the wiped film still is not back mixed, thus, the design equation for a plug flow reactor is used to model the reaction in the falling film still.

$$V = F_{A_0} \int_0^x \frac{dx}{k_1 C_A^2} = \frac{F_{A_0}}{k_1 C_{A_0}^2} \int_0^x \frac{dx}{(1-x)^2} = \frac{2 F_{A_0}}{k_1 C_{A_0}^2 (1-x)}$$

TABLE 2

Parameters for the Pope Still Used in the Model.

| Param | Value | Units | Value | Units | Descrip. |
|---|---|---|---|---|---|
| ρ = | 1.2 | g/ml | 10 | lb/gal | Density |
| d = | 5 | cm | 2 | In | Diameter |
| n = | 6 | rps | 360 | Rpm | RPM |
| η = | 5 | poise | 500 | Cp | Visc. |
| G = | 2.5 | g/s | 20 | lb/hr | Feed |
| L = | 20 | cm | 8 | In | Length |
| $R_e$ = | 0.13 | | | | |
| S = | 0.12 | cm | | | Film Thickness |
| $u_m$ = | 1.11 | Cm/s | | | Film Velocity |

For this system the following initial parameters were used as calculated from the Sample 3 formulation (Example 2) and the parameters above. The concentration of the adipic acid groups were the only ones considered since they were limiting. Then, various values of the rate constant were "tried" until the conversions generated by the model began to reflect the actual conversion found by GPC.

$F_{A0}$=0.0178 Mole/sec AA Acid groups at x=0.
$C_{A0}$=0.984 Mole Adipic Acid groups/mole feed at x=0.
$k_1$=0.0005 Estimate.

To evaluate the model, a stepwise method was used due to the difficulty expressing the viscosity as a function of conversion explicitly. To circumvent this problem, the following method was implemented in a series of spreadsheet calculations:

1. The reaction conversion was expressed as a function of time, X=f(t). The function $f(t) = a\, e^{bt}$ was obtained by regression of the calculated results from the rate equation using data for the range of interest.
2. The viscosity of the mixture was approximated by assuming that viscosity was proportional to $M_w$ and using a known viscosity of 5 Poise at 0.71 conversion. The spreadsheet model was used to calculate $M_w$ and then to estimate viscosity when the conversion was known.
3. Given the viscosity, the film thickness, S, is calculated by the formula given above.
4. In the same manner, the mean velocity of the film was calculated.
5. Time for a series of small, finite intervals was calculated knowing the length of the interval and the velocity.
6. Holdup was then calculated again based on conversion and double-checked against the "actual" holdup as calculated knowing the film thickness, area, and length of each interval.

If the viscosity can be expressed as a function of conversion, then the model may be solved explicitly without the use of an iterative approach. No additional effort was extended to improve the model. It is noted, that as the gel point is approached, the model breaks down using the computational method presented here; however, the model is a suitable means for understanding the characteristics observed in the wiped film still in the present invention. Several conclusions supported by the model include:

1. The process was stable and the conversion was controllable in the region of interest by adjusting residence time (feed rate) or by adjusting the reaction temperature. The approximately linear characteristic of conversion as a function of distance traveled along the still was one feature that makes the process stable.
2. The film thickness did not change by more than a factor of two over the region considered. This was very significant when contrasted with the instability of the reactive extrusion process when practiced in equipment with low L/D.
3. The model assumption that mass transfer of condensed water through the film was not limiting due to the high temperature (greater than 150° C.), the thin film (1 to 2.5 mm), the low viscosity (less than 50 poise) and the expedient removal by vacuum (less than 1 Torr), is good in the region of interest. As the gel point was approached, the mass transfer became limiting due to the high viscosity (greater than 1,000 poise) and the resulting thick film (greater than 7 mm). However, this limitation shows the use of the process to limit conversion in the vacuum still.
4. Conversion to within 0.5% to 1% of the gel point on a wiped film still is accomplished since viscosity is low enough for easy processing (<50 poise) and the reaction rate is controllable as described above.

EXAMPLE 2

In this example, a centrifugal molecular still of the DPI design (shown in FIG. 9) with 40" rotor was used to process 1,830 lb. of pre- gel material feed formulation (Sample 3 above) (adipic acid/palmitic acid/glycerol). The pre-gel feed formulation was pumped to the centrifugal still from one tote and collected in a second tote at a rate in the range of 200 to 350 lb/hr. The target feed rate was 300 lb/hr. The residue and feed totes where switched and the process repeated until a total of three passes were performed.

The multi-pass configuration was equivalent to a continuous process with the flow diagram shown in FIG. 10. The pressure in the centrifugal still remained less than 10 Torr for the entire run.

The operating parameters for the centrifugal still are listed below in Table 3.

TABLE 3

Operating Conditions for Centrifugal Still Run.

| Parameter | Value |
| --- | --- |
| Feed Material | Pre-gel feed formulation 2 |
| Feed Rate, lb/hr | 250–300 |
| Still Residue Temperature Range, ° C. | 116–168 |
| Feed Temperature Range, ° C. | 85–161 |
| Number of Passes | 3 |

After the third pass on the centrifugal still, the tote of pre-gel was placed in a drum oven at 105° C. on Day 1. On Day 3, the vacuum processed pre-gel material was found to have cross-linked in the tote. When the tote was removed from the oven, the crosslinked gel had the consistency of gelatin and was shoveled into pails. Upon cooling to room temperature, the crosslinked gel became hard and tough, making it difficult to collect additional samples.

The GPC results in Table 4 below indicate that the third pass material in the tote was near the gel point. The vacuum processing on the still in conjunction with cure time yields significant conversion as shown by the change in weight average molecular weight in FIG. 11. FIG. 11 also illustrates the extent of reaction for each of the samples listed in Table 4. A measure of viscosity (as an indication of viscosity average molecular weight) indicates the increase in viscosity and the rapid approach to the gel point. Since new material of consistent composition is refreshing the still surface in the continuous process presented, conversion can be controlled by making changes to the feed rate and still temperature.

TABLE 4

Molecular Weight Analysis of Samples from Example 2

| Parameter | Feed | Residue 1$^{st}$ Pass | Residue 2$^{nd}$ Pass | Residue 3$^{rd}$ Pass |
| --- | --- | --- | --- | --- |
| Sample ID | X22858-038-Feed | X22858-038-1 | X22858-038-2 | X22858-038-3 |
| GPC M$_n$ | 794 | 849 | 1,088 | 1,184 |
| GPC M$_w$ | 2,362 | 3,994 | 5,297 | 20,264 |
| Polydispersity | 2.97 | 4.71 | 4.87 | 17.11 |
| Conversion* | ~71% | ~73% | ~74.5 | ~76 |

*GPC assays are the average of three analytical tests. Gel point was estimated at 76.9% conversion. Data is graphed in FIG. 11.

The invention has been described in detail with particular reference to preferred embodiments thereof, but it will be understood that variations and modifications can be affected within the spirit and scope of the invention.

What is claimed is:

1. A process for making a high molecular weight pre-gel for a crosslinked branched polyester comprising:
   a) reacting polyester precursor repeat units formed from (1) at least one polyol having three or more hydroxyl groups or esters thereof; and (2) at least one aliphatic or aromatic polyfunctional acid or ester thereof, or a mixture thereof, wherein the reaction is conducted via condensation polymerization in a continuous or semi-continuous, or batch reactor stage to form a pre-gel having a molecular weight of from about 1000 to 4000 weight average molecular weight, thereby providing a low molecular weight pre-gel; and
   b) further reacting the low molecular weight pre-gel via condensation polymerization in a continuous thin-film reactive vacuum processing stage to form a pre-gel having a molecular weight of about greater than 5000 weight average molecular weight, thereby providing a high molecular weight pre-gel.

2. The process according to claim 1, wherein the vacuum processing stage comprises a wiped film still apparatus.

3. The process according to claim 1, wherein the vacuum processing stage comprises a plurality of wiped-film apparati.

4. The process according to claim 1, wherein the vacuum processing stage comprises an apparatus that generates a thin film by centrifugal force.

5. The process according to claim 1, wherein the vacuum processing stage comprises a plurality of apparati that generate a thin film by centrifugal force.

6. The process of claim 1, wherein the high molecular weight pre-gel in the vacuum processing condensation reaction is formed to within a range from about 2% to about 0.5% of the gel point of the pre-gel.

7. The process of claim 6, wherein the high molecular weight pre-gel formed in the vacuum processing stage is formed at a temperature of from about 120° C. to about 300° C., at a pressure of less than 20 Torr, for a period of from about 0.5 seconds to about 5 minutes.

8. The process of claim 6, wherein the pre-gel is partially condensed at a temperature of from about 120° C. to about 200° C., under a pressure of less than 1 Torr, for a period of from about 2 seconds to about 1 minute.

9. The process of claim 6, wherein the pre-gel is partially condensed at a temperature of from about 140° C. to about 180° C., under a pressure of less than 200 mTorr, for a period of from about 15 seconds to about 30 seconds.

10. The process of claim 6, wherein the high molecular weight pre-gel is discharged from the vacuum processing stage and crosslinked by curing in a container.

11. The process of claim 6, further comprising directing the high molecular weight pre-gel to a continuous stirred tank reactor and further reacting the high molecular weight pre-gel to within about 0.5% of the gel point of the pre-gel.

12. The process of claim 11, wherein the high molecular weight pre-gel is discharged from the stirred tank into a container and crosslinked by curing.

13. The process of claim 11, wherein the high molecular weight pre-gel from the stirred tank reactor is extruded or continuously processed at a temperature of from about 60° C. to about 300° C. to form a crosslinked branched polyester gel.

14. The process of claim 13, further comprising processing in a vibratory feeder or an additional extruder to lower the temperature of the crosslinked polyester gel.

15. The process of 13, wherein the crosslinked polyester gel is directed into a product container.

16. The process of claim 15, wherein the container is maintained at a temperature of from about 25° C. to about 150° C.

17. The process according to claim 1, wherein at least 50% by weight of unreacted repeat units and/or low molecular weight reaction by-products or oligomers are removed.

18. The process according to claim 17, wherein the unreacted repeat units and/or lower molecular weight reaction by-products or oligomers are removed by distillation in the vacuum processing stage, thereby resulting in an increase in molecular weight.

19. The process of claim 1, wherein the polyol contains from 2 to 100 carbon atoms.

20. The process of claim 1, wherein the aliphatic or aromatic polyfunctional acid contains from 2 to 100 carbon atoms.

21. The process of claim 1, further comprising reacting precursor repeat units formed from at least one monohydroxy alcohol.

22. The process of claim 1, wherein the polyol is selected from the group consisting of glycerol, pentaerythritol, polyglycol and polyglycerol, and the aliphatic polyfunctional acid is selected from the group consisting of malonic, succinic, tartaric, malic, citric, fumaric, glutaric, adipic, pimelic, sebacic, suberic and azelaic acid and the aromatic polyfunctional acid is selected from the group consisting of terephthalic, isophthalic acid, trimelletic, pyromelletic and naphthalene 1,4-, 2,3-, or 2,6-, dicarboxylic acid.

23. The process of claim 1, wherein the pre-gel further comprises repeat units formed from: 1) at least one long chain aliphatic carboxylic acid having from about 12 to about 26 carbon atoms or an ester thereof; or 2) at least one long chain aromatic monocarboxylic acid selected from the group consisting of: benzoic acid, naphthoic acid, 1-methyl-2-naphthoic acid, 2-isopropyl-1-naphthoic acid, and naphthoic acid substituted with linear or branched alkyl groups containing 1 to 6 carbon atoms.

24. The process of claim 23, wherein the long chain aliphatic carboxylic acid is selected from the group consisting of lauric, myristic, palmitic, stearic, arachdic, cerotic, dodecylinic, palmitoleic, oleic, linoleic and erucic acid and the aromatic monocarboxylic acid is selected from the group consisting of benzoic acid, naphthoic acid, and substituted naphthoic acid.

25. The process of claim 24, wherein the long chain aliphatic carboxylic acid is palmitic acid.

26. The process of claim 1, further comprising repeat units formed from: 1) at least one long chain aliphatic carboxylic acid having from about 12 to about 26 carbon atoms or an ester thereof; or 2) at least one long chain aromatic monocarboxylic acid selected from the group consisting of: benzoic acid, naphthoic acid, 1-methyl-2-naphthoic acid, 2-isopropyl-1-naphthoic acid, and naphthoic acid substituted with linear or branched alkyl groups containing 1 to 6 carbon atoms.

27. The process of claim 1, wherein the polyester further comprises repeat units formed from an alcohol, a polyol or a derivative thereof comprising propylene glycol, 1,3-butanediol, 1,3-propanediol, 1,4-butanediol, triacetin, trimethylolpropane, pentaerythritol, cellulose ether, cellulose ester, lauryl alcohol, myristyl alcohol, cetyl alcohol or stearyl alcohol.

28. The process of claim 1, wherein the pre-gel composition comprises reacting repeat units formed from: (1) at least one polyol having three or more hydroxyl groups or an ester thereof; (2) at least one aliphatic or aromatic polyfunctional acid, an ester thereof or a mixture thereof; and (3) optionally, a) at least one long chain aliphatic carboxylic acid having from about 12 to about 26 carbon atoms, or an ester thereof; or b) at least one long chain aromatic monocarboxylic acid selected from the group consisting of: benzoic acid, naphthoic acid, 1-methyl-2-naphthoic acid, 2-isopropyl-1-naphthoic acid, and naphthoic acid substituted with linear or branched alkyl groups containing 1 to 6 carbon atoms.

29. The process of claim 28, wherein the aliphatic or aromatic polyfunctional acid or ester thereof has two functional groups.

30. The process of claim 1, wherein the pre-gel composition comprises reacting repeat units formed from: (1) at least one polyol having two or more hydroxyl groups or an ester thereof; (2) at least one aliphatic or aromatic polyfunctional acid having at least three functional groups, an ester thereof or a mixture thereof; and (3) optionally, a) at least one long chain aliphatic carboxylic acid having from about 12 to about 26 carbon atoms, or an ester thereof; or b) at least one long chain aromatic monocarboxylic acid selected from the group consisting of: benzoic acid, naphthoic acid, 1-methyl-2-naphthoic acid, 2-isopropyl-1-naphthoic acid, and naphthoic acid substituted with linear or branched alkyl groups containing 1 to 6 carbon atoms.

31. The process of claim of 30, wherein the aliphatic or aromatic polyfunctional acid or ester has three functional groups.

32. The process of claim 1, comprising repeat units formed from (1) glycerol, (2) adipic acid; and (3) palmitic acid.

* * * * *